(12) United States Patent
Keum et al.

(10) Patent No.: US 9,197,436 B2
(45) Date of Patent: Nov. 24, 2015

(54) METHOD AND APPARATUS FOR USING CONTENTS OF WIRELESS TERMINAL IN HOME NETWORK SYSTEM

(75) Inventors: Ji Eun Keum, Suwon-si (KR); Jun Hyung Kim, Suwon-si (KR); Bo Sun Jung, Seongnam-si (KR); Sung Oh Hwang, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 971 days.

(21) Appl. No.: 12/764,619

(22) Filed: Apr. 21, 2010

(65) Prior Publication Data

US 2010/0265887 A1   Oct. 21, 2010

(30) Foreign Application Priority Data

Apr. 21, 2009 (KR) .................. 10-2009-0034804
Apr. 30, 2009 (KR) .................. 10-2009-0038305

(51) Int. Cl.
*H04L 12/28* (2006.01)
(52) U.S. Cl.
CPC ........ *H04L 12/2812* (2013.01); *H04L 12/2834* (2013.01)
(58) Field of Classification Search
CPC . H04L 12/2812; H04L 12/2834; H04L 67/16; H04L 67/28; H04L 67/101
USPC ............... 370/397, 399, 395.21, 401, 409
See application file for complete search history.

(56) References Cited

U.S. PATENT DOCUMENTS

| | | | |
|---|---|---|---|
| 7,062,265 B1 | 6/2006 | Chang et al. | |
| 2004/0193609 A1* | 9/2004 | Phan et al. | 707/10 |
| 2005/0071745 A1* | 3/2005 | Ehrich et al. | 715/500.1 |
| 2007/0073831 A1* | 3/2007 | Oscherov et al. | 709/217 |
| 2009/0238108 A1* | 9/2009 | Nakae et al. | 370/315 |

FOREIGN PATENT DOCUMENTS

| | | |
|---|---|---|
| KR | 100426155 | 4/2004 |
| KR | 1020040054213 | 6/2004 |
| KR | 1020050025550 | 3/2005 |
| KR | 100600747 | 7/2006 |
| WO | WO 2005/004387 | 1/2005 |
| WO | WO 2006/095787 | 9/2006 |

OTHER PUBLICATIONS

Korean Office Action dated Jan. 9, 2015 issued in counterpart application No. 10-2009-0038305.

* cited by examiner

*Primary Examiner* — Ricky Ngo
*Assistant Examiner* — Wei-Po Kao
(74) *Attorney, Agent, or Firm* — The Farrell Law Firm, P.C.

(57) ABSTRACT

Provided is a method for using home network contents of a wireless terminal located outside a home network. The method includes transmitting bandwidth information and wireless terminal information to a contents storage device, when a home gateway receives a remote access request message including the bandwidth information from the wireless terminal; setting, by the home contents storage device, the bandwidth information as a filtering parameter for the wireless terminal; filtering, by the contents storage device, contents available for the wireless terminal and generating a contents list corresponding to the wireless terminal by using the filtering parameter, upon receiving a request for the contents list; and transmitting the generated contents list to the wireless terminal.

14 Claims, 8 Drawing Sheets

METHOD AND APPARATUS FOR USING CONTENTS OF WIRELESS TERMINAL IN HOME NETWORK SYSTEM

PRIORITY

This application claims priority under 35 U.S.C. §119(a) to an application filed in the Korean Intellectual Property Office on Apr. 21, 2009 and assigned Serial No. 10-2009-0034804, and an application filed in the Korean Intellectual Property Office on Apr. 30, 2009, and assigned Serial No. 10-2009-0038305, the contents of which are incorporated herein by reference.

BACKGROUND OF THE INVENTION

1. Field of the Invention

The present invention relates generally to a method and an apparatus for using contents of a wireless terminal in a home network system, and more particularly, to a method and an apparatus for using contents of a wireless terminal in a home network system that stably uses an Internet Protocol TeleVision (IPTV) service usable in the home network through the wireless terminal, while the wireless terminal is outside the home network, without the degradation of the service.

2. Description of the Related Art

Due to the increased distribution of home networks, existing network environments that are primarily based on Personal Computers (PCs) in homes have been extended to include home appliances that use various low-level network technologies. Accordingly, Universal Plug and Play (UPnP) technology has been proposed to accommodate the necessity of techniques capable of networking these home appliances by using an IP protocol according to a standardized method. UPnP is a universal-purpose standardized protocol by which network devices of the home network can cooperate with each other. UPnP consists of a Controlled Device (CD), which is a device that is connected to and controlled by an IP-based home network, and a Control Point (CP) for controlling the CD.

Hereinafter, a configuration of UPnP device architecture 1.0 standard will be described with reference to FIG. 1.

The UPnP device architecture 1.0 standard shown in FIG. 1 enables home appliances in a home network system to perform peer-to-peer networking without centralized management.

Generally, in a home network middleware, an UPnP device performs a service by performing various actions and setting state variables, and a control point may use the service after an automatic discovery of the UPnP device.

A UPnP device according to the UPnP device architecture 1.0 standard is searched in a distribution and open networking mode using IP multicast in a home network system. However, achievement of a current IP multicast service is within an Internet available range cannot be ensured. Accordingly, it is difficult to reliably control a UPnP device using information obtained by searching the UPnP device when using the Internet to control the device.

Therefore, when the UPnP device or the control point is physically distant from a home network, a UPnP remote access architecture is proposed in order to operate the UPnP device or control point as if it is physically located in the same network. The UPnP remote access architecture includes a Remote Access Server (RAS) 105 located in the home network and a Remote Access Client (RAC) 109 located in a remote network. After profile matching is achieved between the RAS 105 and the RAC 109, a Virtual Private Network (VPN) 107 is setup for a remote access therebetween. The RAC 109 accesses content stored in a device in a home as if the RAC 109 existed in the home. In the example illustrated in FIG. 1, the RAS 105 is connected to a home contents storage device 101 through a UPnP 103.

FIG. 2 is a sequence diagram illustrating a method for accessing a conventional UPnP remote access service using an IP Multimedia Subsystem (IMS) network.

Referring to FIG. 2, a wireless terminal 100 located in a remote network accesses a home network to receive a home service. To this end, the wireless terminal 100 transmits a remote access request message for remote access to a gateway (or a home gateway) 300 having a remote access server in the home network by using an SIP protocol, in step 220. The home gateway 300 transmits, to the wireless terminal 100, a response message as a reply to the remote access request message, in step 230. A communication path for remote access defined in the UPnP is setup between the wireless terminal 100 and the home gateway 300, in step 240. The communication path can be setup using Virtual Private Network (VPN). Hereinafter, it is assumed that the communication path is the VPN.

The wireless terminal 100 directly accesses a home contents storage device 400 having home contents using the VPN connected at step 240, and sends a request for a contents list and corresponding additional information (contents selection UPnP Content Directory Service (CDS)), in step 250. Accordingly, in step 260, the home contents storage device 400 transmits the contents list and corresponding additional information requested from by wireless terminal 100 at step 250. Then, the wireless terminal 100 transmits an UPnP action to the home contents storage device 400 so that a user may select and plays contents, in step 270. The home contents storage device 400 transmits contents selected at step 270 to the wireless terminal 100, in step 280.

However, in the above typical procedure, when the wireless terminal 100 receives the home contents through the remote access, a VPN is setup between the wireless terminal 100 and the home gateway 300 before the user selects contents. Accordingly, when the wireless terminal 100 attempts to receive contents that have a greater bandwidth than that a bandwidth of the setup VPN, a degradation of Quality of Service (QoS) can occur.

SUMMARY OF THE INVENTION

The present invention has been made to address at least the above problems and/or disadvantages and to provide at least the advantages described below. Accordingly, an aspect of the present invention provides a method and an apparatus for using contents of a wireless terminal in a home network system that enables the wireless terminal to remotely use home contents and services without degrading a user's Quality of Experience (QoE) and QoS.

According to an aspect of the present invention, a method for using home network contents of a wireless terminal located outside a home network is provided. The method includes transmitting, by the wireless terminal, bandwidth information and wireless terminal information to a contents storage device, when a home gateway receives a remote access request message including the bandwidth information; setting, by the contents storage device, the bandwidth information as a filtering parameter for the wireless terminal; requesting a contents list for the wireless terminal; filtering, by the contents storage device, contents available for the wireless terminal and generating the contents list according to the filtering parameter, upon requesting the contents list; and transmitting the generated contents list to the wireless terminal.

According to another aspect of the present invention, a method for using home network contents of a wireless terminal located outside a home network is provided. The method includes authenticating a wireless terminal and collecting user information, when a service provider receives a filtering setting request message from the wireless terminal; transmitting, by the service provider, a filtering setting request message including the user information to a home gateway; setting, by a contents storage device, the user information as a filtering parameter for the wireless terminal, when the home gateway transmits wireless terminal information and the user information to the contents storage device; filtering, by the contents storage device, contents available for the wireless terminal and generating a contents list for the wireless terminal according to the filtering parameter, upon receiving a request for the contents list; and transmitting the generated contents list to the wireless terminal.

According to another aspect of the present invention, an apparatus for providing contents from a home network to a wireless terminal located outside a home network is provided. The apparatus includes a contents storing area for storing the contents; a filtering parameter storing area for setting and storing bandwidth information of the wireless terminal as a filtering parameter; a filtering parameter extractor for checking wireless terminal information, and extracting the filtering parameter from the filtering parameter storing area, upon receiving a request for a contents list corresponding to the wireless terminal; a contents list generator for filtering contents available to the wireless terminal from the contents storing area in order to generate a contents list according to the extracted filtering parameter; and a communication unit for transmitting the generated contents list to the wireless terminal.

BRIEF DESCRIPTION OF THE DRAWINGS

The objects, features and advantages of the present invention will be more apparent from the following detailed description in conjunction with the accompanying drawings, in which.

DETAILED DESCRIPTION OF EMBODIMENTS

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Although this description and the associated drawings include details of several alternate embodiments of the present invention, further alternate embodiments can be implemented without departing from the scope of this invention. Consequently, it is to be understood that the following description is provided for example only and is not intended as a limitation of the present invention. Furthermore, all alternate embodiments that are obvious modifications of this disclosure are within the scope of the present invention.

For convenience of the description of the present invention, although terms of objects defined according to a UPnP a home communication standard, a Telecommunication and Internet converged Services and Protocols for Advanced Networking (TISPAN), which an IPTV standard, and Open IPTV Forum (OIPF) standards may also be used in accordance with the present invention. Accordingly, the standard and terms specific to the UPnP standards do not limit the scope of the present invention, and the present invention is applicable to other systems with a similar technical background.

First Embodiment

Figure 1:
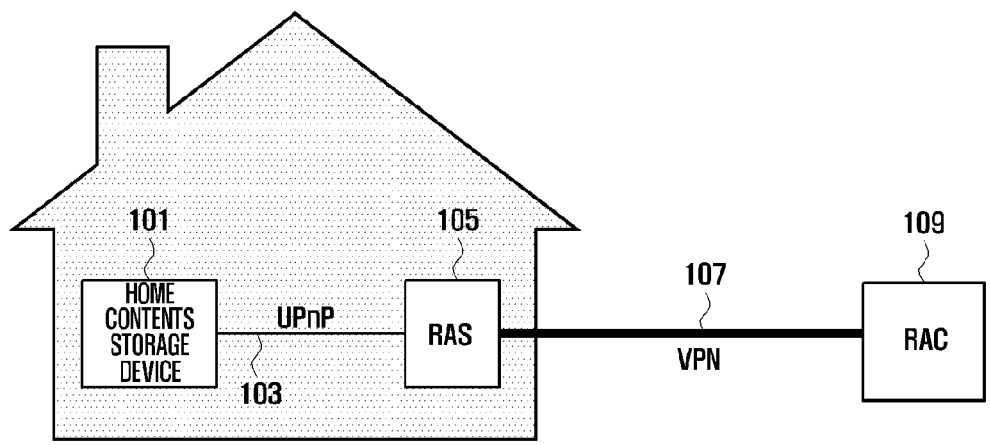
FIG. 1 is a view illustrating a configuration of a UPnP device architecture 1.0 standard.
Figure 2:
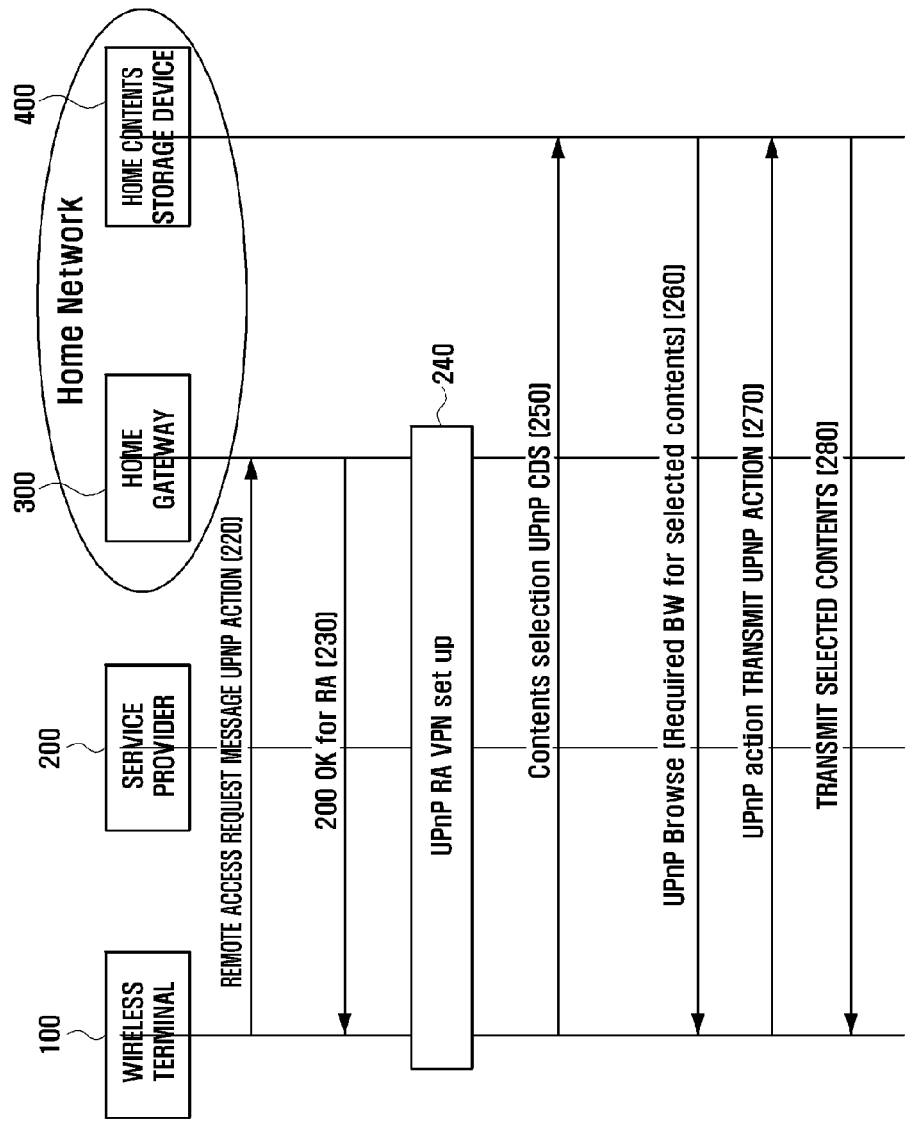
FIG. 2 is a sequence diagram illustrating a method for accessing a conventional UPnP remote access service using an IMS network.
Figure 3:
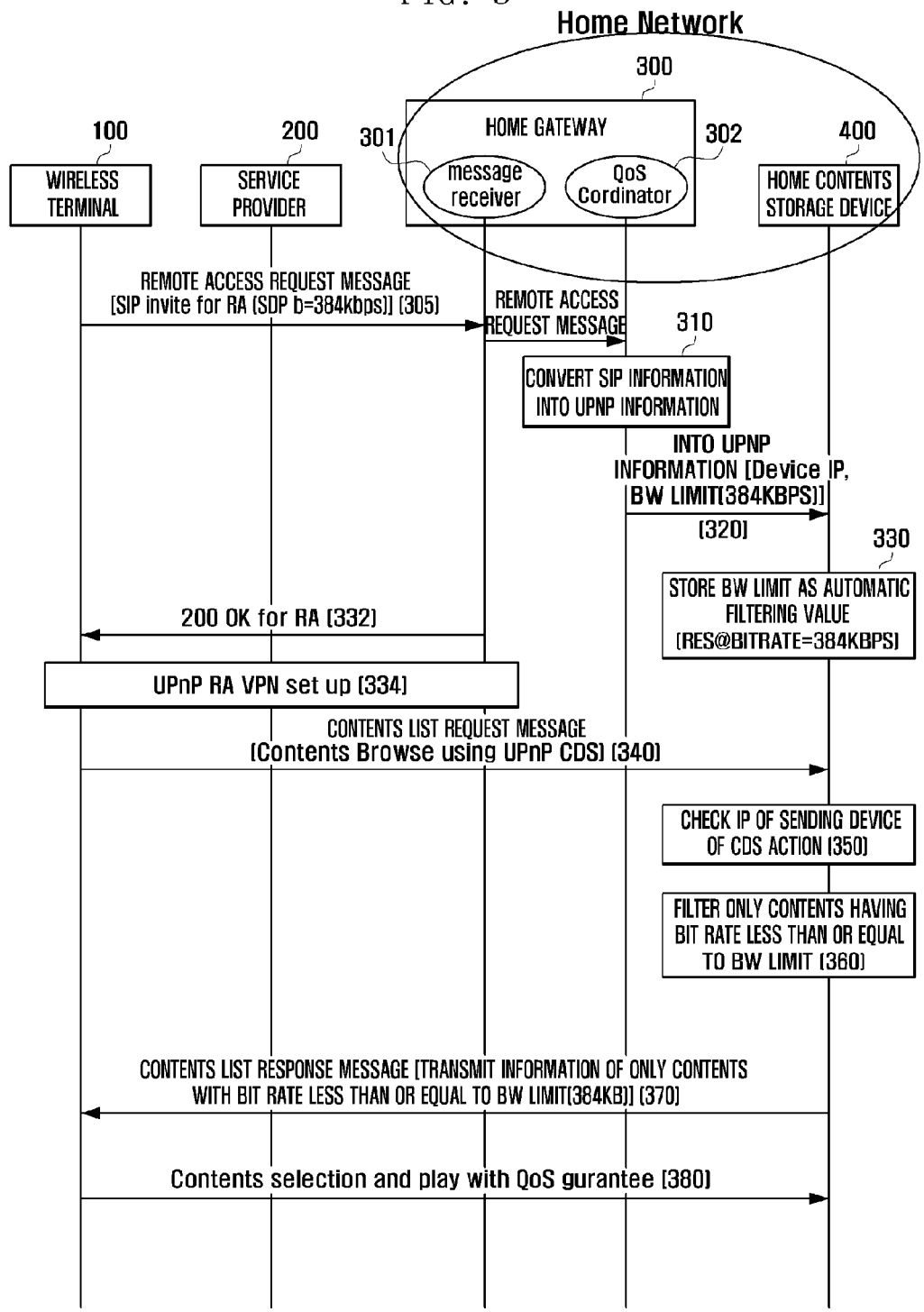
FIG. 3 is a sequence diagram illustrating a method for accessing to home and using home contents by a wireless terminal according to a first embodiment of the present invention.

A principal operation according a first embodiment of the present invention will be explained with reference to FIG. 3. FIG. 3 is a sequence diagram illustrating a method for accessing a home network and using home contents by a wireless terminal according to a first embodiment of the present invention.

A wireless terminal 100 outside a home network transmits a remote access request message for remote access to a home gateway 300 existing inside the home network to the home gateway 300, in step 305. In this case, the remote access request message may be a Session Initiation Protocol (SIP) invite message. Here, the remote access request message transmitted from the wireless terminal 100 may contain a user's subscription information or bandwidth information (e.g., a bit rate) determined in advance according to a subscription policy of a service entity. In the present example, 384 kbps according to a TISPAN Working Group 5 (WG5) standard is used as the above-described bandwidth.

According to an embodiment of the present invention, the remote access request message transmitted from the wireless terminal 100 at step 305 can be transmitted to a service provider 200, and authentication and extraction of user information can be performed therein, and can be transmitted to the home gateway 300.

The remote access request message transmitted from the wireless terminal 100 is received by a message receiver 301 of the home gateway 300. A QoS coordinator 302 of the home gateway 300 receives the remote access request message from the message receiver 301, extracts bandwidth information therefrom, and converts the extracted bandwidth information into UPnP information, in step 310. Namely, the QoS coordinator 302 converts an SIP-formatted message into an UPnP-formatted message.

The QoS coordinator 302 sends the UPnP message to the home contents storage device 400, in step 320. In the present example, the UPnP message is an "action" defined according to a UPnP protocol, which contains the bandwidth information and an IP address of the wireless terminal 100. An example of the action between the home gateway 300 and the home contents storage device 400 applied at step 320 is defined in Table 1. The action defined in Table 1 is merely an example, and the action can be defined in other ways in accordance with the present invention.

Table 1 below refers to a "ModifyCDSaction( )" action, which is sent from a device through a UPnP Remote Access (RA) connection. When a device receives this action, the device must store the arguments inside. In Table 1, "RadevicelP" refers to IP of the device that request RA connection with a QoS guarantee, and "Bwlimit" refers to a bandwidth value of the RA connection. Table 1 indicates an argument definition of an action sending limit information for ensuring QoS in home.

TABLE 1

| Argument | Direction | Related statevariable |
| --- | --- | --- |
| RAdevicelP | IN | A_ARG_TYPE_Filter |
| Bwlimit | IN | A_ARG_TYPE_Filter |

The home contents storage device 400 stores received information as indicated in Table 2 and stores a bandwidth as an automatic filtering value, in step 330. Table 2 indicates information for ensuring a remote access service of a wireless terminal.

TABLE 2

| Device IP | Filter |
| --- | --- |
| 103.204.134.241 | Filter(res@bitrate<384) |

Meanwhile, the message receiver 301 of the home gateway 300 transmits, to the wireless terminal 100, a response to the remote request message requested at step 305, in step 332. A VPN is setup between the wireless terminal 100 and the home gateway 300 due to transmission of the response message, in step 334.

When the VPN is set up, the wireless terminal 100 may access the home contents storage device 400 through the VPN established at step 334 to transmit a contents list request message, such as a contents browser, using UPnP CDS thereto, in step 340. When the contents list request message is transmitted, a filtered contents list parameter for selecting a filtered or non-filtered contents list request according to a user's selection can be set as illustrated in Table 3. A value of the filtered contents list parameter is set to "True", to indicate a request for a filtered contents list. Conversely, a value of the filtered contents list parameter is set to "False" to indicate a request for all the contents lists. Table 3 indicates information for a request of a filtered contents list (Filtered contents list parameter).

TABLE 3

| Parameter | Value(Boolean) |
| --- | --- |
| Filtered contents list | True/False |
| . . . | . . . |

According to an embodiment of the present invention, the contents list request message uses a "Browse" method specified in the UPnP.

When the wireless terminal 100 accesses the home contents storage device 400, the home contents storage device 400 checks an IP address of the wireless terminal 100 that has transmitted the contents list request message, in step 350. Moreover, according to an embodiment of the present invention, the home contents storage device 400 may additionally check the filtered contents list parameters illustrated in Table 3 included in the contents list request message. The home contents storage device 400 also checks a bandwidth that is set in response to the IP address of the wireless terminal 100, and filters contents having a bit rate less than a bit rate of the checked bandwidth among available contents stored in the home contents storage device 400, in step 360. If the filtered contents list parameters are not set, the home contents storage device 400 transmits a filtered contents list. The home contents storage device 400 transmits, to the wireless terminal 100, a contents list response message including the filtered contents list constructed at step 360 or a contents list corresponding to all contents, in step 370. Accordingly, the wireless terminal 100 selects contents to be executed from the transmitted contents list, in step 380.

Through the foregoing procedures, a user receives only contents corresponding to a bandwidth less than a preset bandwidth from among the contents stored in the home contents storage device 400, and selectively plays the received contents using the wireless terminal 100. Thus, the user can also access and use home contents in the outside of the home network without service degradation.

Second Embodiment

Figure 4:
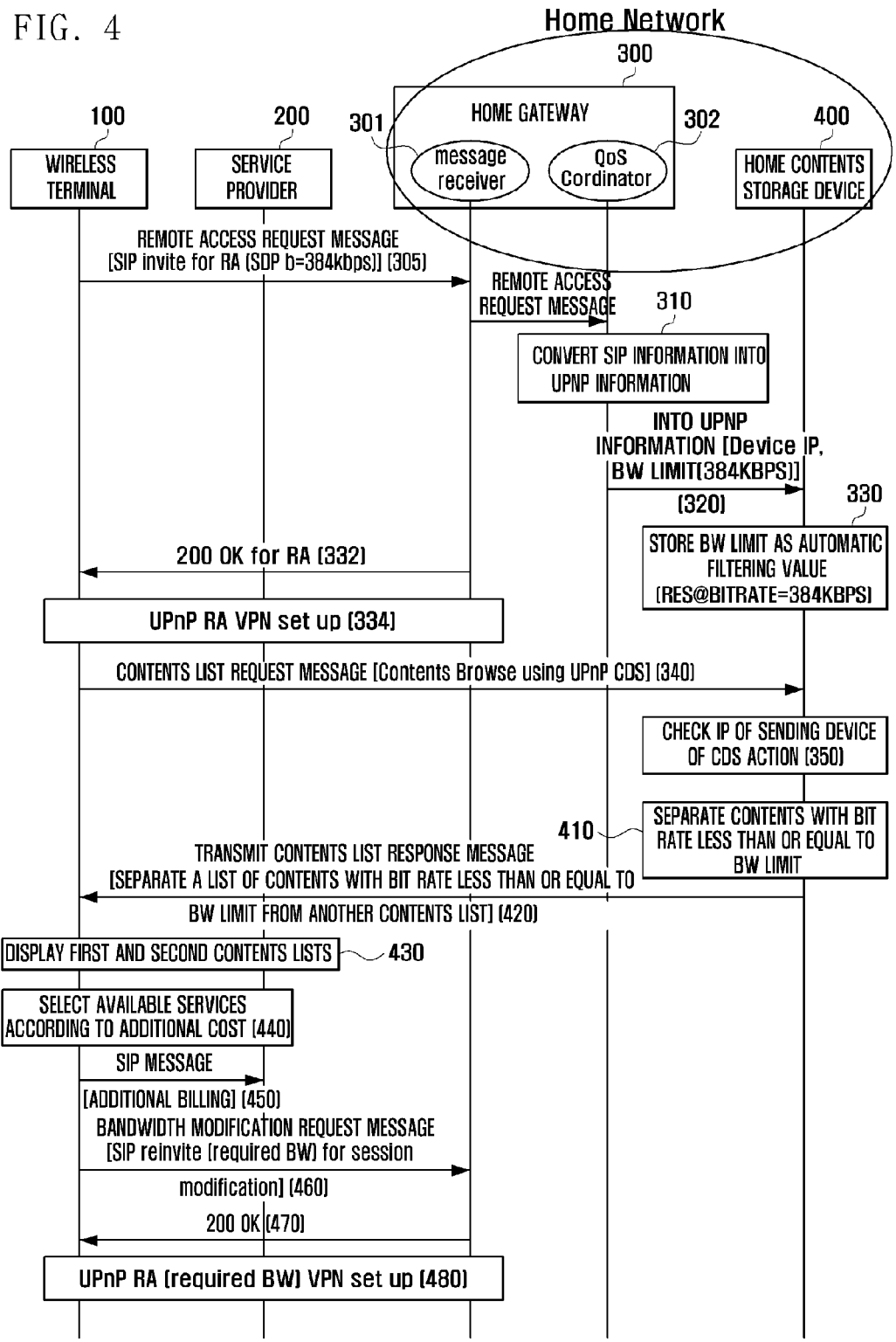
FIG. 4 is a sequence diagram illustrating a method for accessing to home and using home contents by a wireless terminal mounted outside the home according to a second embodiment of the present invention.

FIG. 4 is a sequence diagram illustrating a method for accessing a home network and using home contents by a wireless terminal located outside a home network according to a second embodiment of the present invention.

According to the second embodiment of the present invention, a home contents storage device 400 further sends contents information in which QoS is not ensured for resources currently assigned to a user requesting remote access outside the home network. Accordingly, the user may select an increased bandwidth assignment at an additional expense, thereby ensuring QoS of contents in which the QoS is not currently ensured, and use these contents.

Steps 305 to 350 shown in FIG. 4 are identical with steps 305 to 350 of the first embodiment, and thus the description thereof is omitted for conciseness.

The home contents storage device 400 separates contents having a bit rate less than or equal to a bit rate of contents transmitted at step 305 from the stored contents, in step 410. The home contents storage device 400 transmits, to the wireless terminal 100, a contents list response message corresponding to the contents list request message, in step 420. According to the second embodiment of the present invention, the contents list response message contains a first contents list available for current resources (e.g., contents having a bit rate equivalent to or less than 384 kbps) and a second contents list that can be used when an additional cost is paid (i.e., an additional fee is processed), respectively.

Accordingly, a user's wireless terminal 100 distinguishes the first contents list available for current resources and the second contents list that can be used when an additional cost is paid, and displays the first and second contents lists, in step 430. According to the first embodiment of the present invention, the user cannot use contents with a bandwidth greater than a bandwidth of a currently assigned resource. However, according to the second embodiment of the present invention, the user can use the contents that could not be previously accessed, by paying an additional cost and further receiving assignment of a bandwidth.

According to a user's selection, the user can pay additional cost and select available services (contents) using the wireless terminal 100, in step 440. Accordingly, the wireless terminal 100 transmits an additional billing payment request message (SIP message) to a service entity, such as the service provider 200 and pays additional cost so that the user may pay additional cost necessary to use selected contents, in step 450.

Further, the wireless terminal 100 transmits a bandwidth modification request message (SIP reinvite for session modification) to the home gateway 300, in step 460. In the present example, the bandwidth modification request message is a message for requesting a modification to an existing session, in order to additionally assign a necessary bandwidth to the contents selected in step 440. The home gateway 300 receives the bandwidth modification request message and transmits a response signal to the wireless terminal 100, in step 470. A VPN with an additionally modified bandwidth is setup between the wireless terminal 100 and the home gateway 300 in order for a user to use selected contents without service degradation, in step 480.

Third Embodiment

Figure 5:
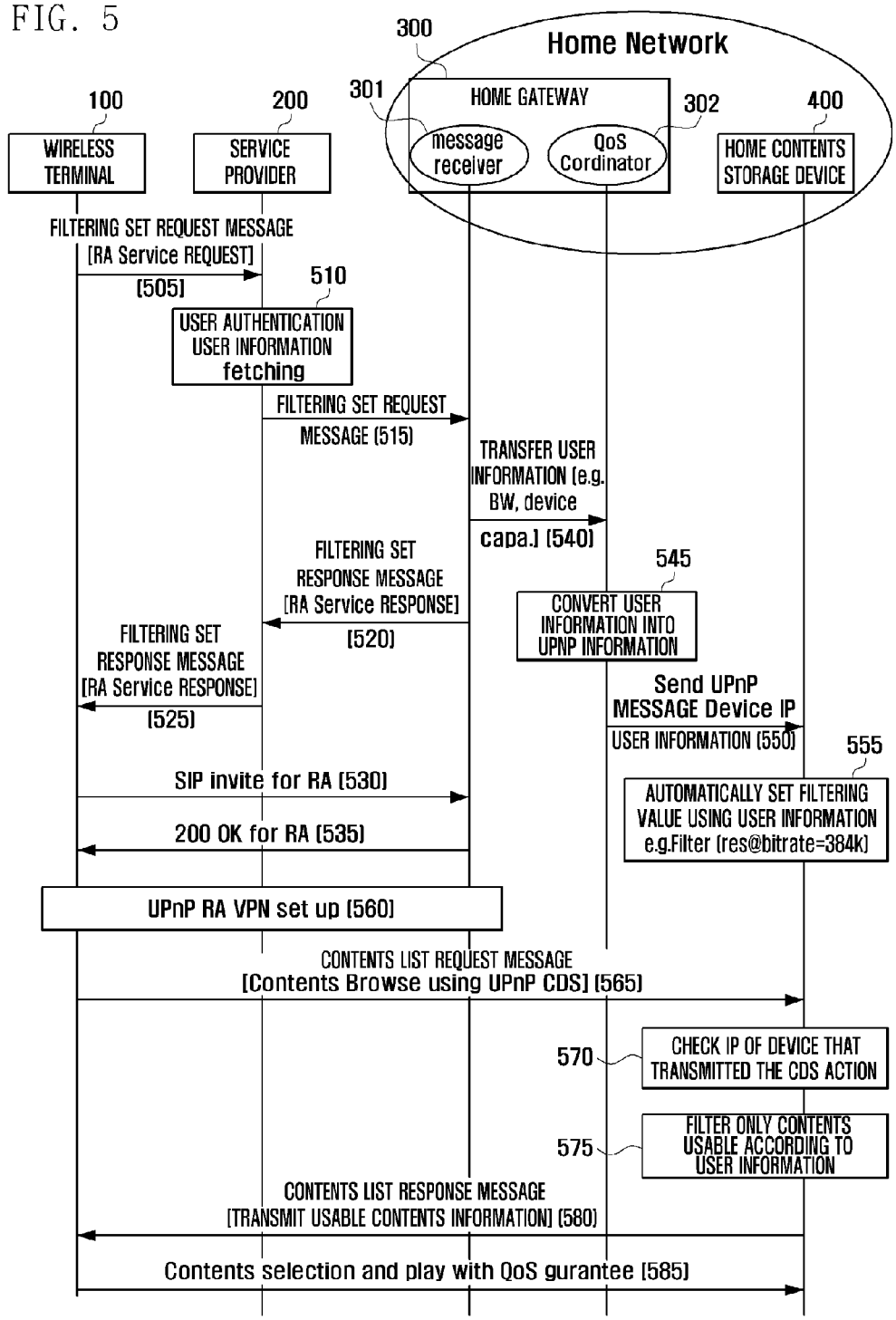
FIG. 5 is a sequence diagram illustrating a method for accessing to home and using home contents by a wireless terminal mounted outside the home according to a third embodiment of the present invention.

FIG. 5 is a sequence diagram illustrating a method for accessing a home and using home contents by a wireless terminal located outside a home network according to a third embodiment of the present invention.

The method according to the third embodiment of the present invention includes use of a network device or service providing an IPTV service together with IMS. A service provider 200 performs a remote access service procedure for a user of a wireless terminal 100, and manages user information such as a screen size, resolution, and a COder/DECoder (CODEC) of the wireless terminal 100. Further, the service provider 200 executes user authentication when a service is requested.

Through the help of the service provider 200, the method according to the third embodiment of the present invention filters contents based on a device performance of the wireless terminal 100, in order to secure a user's QoE as well as a QoS provided according to the first or second embodiment of the present invention. A detailed procedure of the method according to the third embodiment of the present invention will be described with reference to FIG. 5.

Referring to FIG. 5, a wireless terminal 100 transmits a filtering set request message (i.e., an RA request) to a service provider 200, in step 505. The service provider 200 performs user authentication for the wireless terminal 100 and performs a procedure of collecting user information stored when a user subscribes to a service from the service provider 200, in step 510. According to the third embodiment of the present invention, the user information may contain bandwidth information (e.g., a bit rate) previously determined according to a user's subscription information or a policy of a service entity.

The service provider 200 transfers a filtering set request message containing user information to a message receiver 301 of the home gateway 300, in step 515. Accordingly, the message receiver 301 transmits a filtering set response message 520 to the service provider 200 as a response to the received filtering set request message, in step 520. The service provider 200 sends the received filtering set response message to the wireless terminal 100, in step 525.

Since the wireless terminal 100 determines whether a normal service use is possible, the wireless terminal 100 transmits a remote access request message (SIP INVITE message) for remote access service to the message receiver 301 of the home gateway 300 through an IMS network, in step 530. The wireless terminal 100 receives a corresponding response message 535, in step 535.

In the meantime, the message receiver 301, which has received the remote access service request message from the service provider 200 at step 515, sends user information included in the received remote access service request message to a QoS coordinator 302, in step 540. Accordingly, the QoS coordinator 302 converts the user information into UPnP information in step 545, and sends a UPnP message containing the user information and a user IP address to a home contents storage device 400 in step 550. The home contents storage device 400 determines which user corresponds to the UPnP message by using the received user IP address, and sets a filtering value using the received user information, in step 555.

Steps 520 to 535, and steps 540 to 555 may be performed independently from each other. Meanwhile, since the wireless terminal 100 receives an assignment of available bands through a remote access request message (i.e., the SIP INVITE message) and a corresponding response at steps 530 and 535, the wireless terminal 100 can set a VPN for UPnP remote access with the home gateway 300 at step 560.

By performing the foregoing procedures, the wireless terminal 100 completes an information receiving procedure from a home contents storage device 400 in a home network to use a home network service through an UPnP.

The wireless terminal 100 transmits a contents list request message (e.g., a content "Browse" message according to the UPnP CDS action standard) to the home contents storage device 400 in order to check a contents list stored in the home contents storage device 400, in step 565. The home contents storage device 400 checks an IP address of the wireless terminal 100 that has transmitted the contents list request message in step 570, selects only contents usable by the user sending a request for a service using set filtering parameters by the user to generate a contents list response message, in step 575, and transmits the selected contents to the wireless terminal 100, in step 580. The wireless terminal 100 may examine only contents available from a contents list of the home contents storage device 400, and select contents to be used to send a request for a service the selected contents to be used, in step 585.

Figure 6:
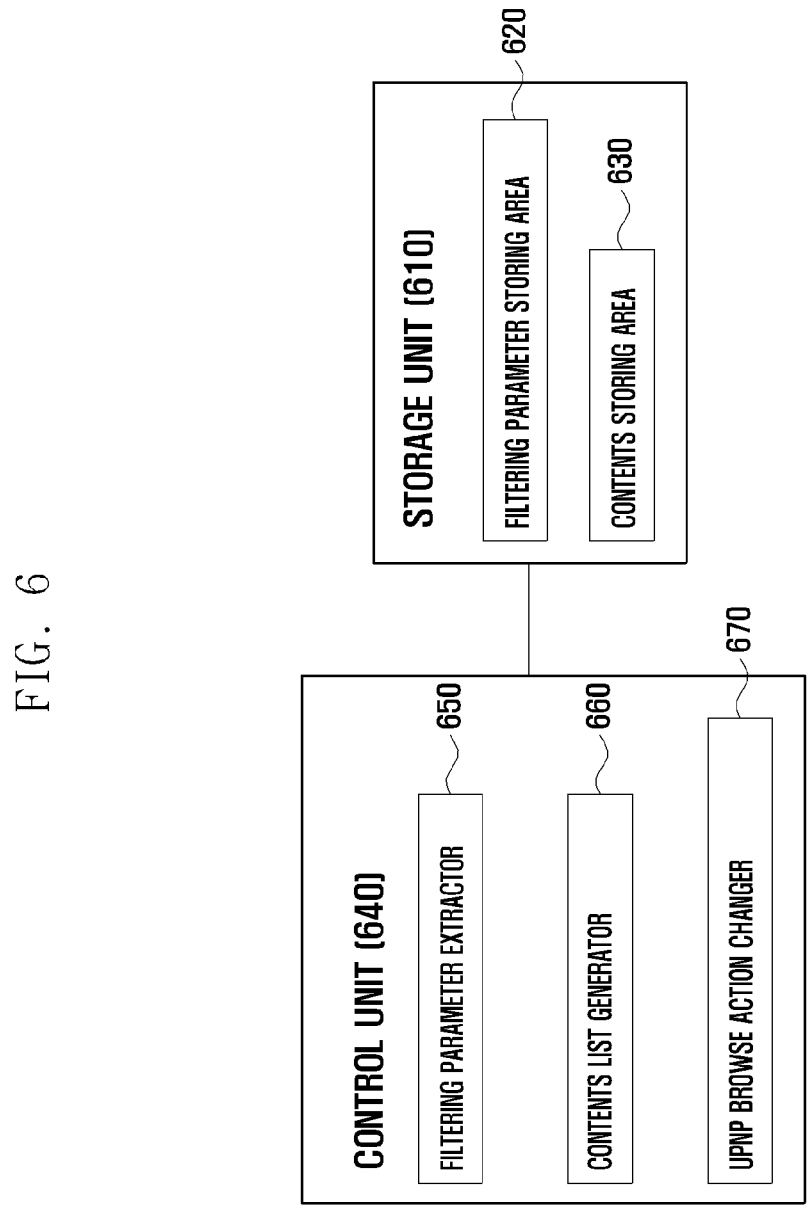
FIG. 6 is a block diagram illustrating an internal configuration of a home contents storage device 400 according to an embodiment of the present invention.

FIG. 6 is a block diagram illustrating an internal configuration of a home contents storage device 400 according to an embodiment of the present invention. The home contents storage device 400 includes a storage unit 610 and a control unit 640.

The storage unit 610 includes a filtering parameter storing area 620 and a contents storing area 630. The filtering parameter storing area 620 sets and stores bandwidth information of a wireless terminal as a filtering parameter.

The filtering parameter storing area 620 can receive and store, from the wireless terminal, a contents list parameter, which determines the performance of filtering. The contents storing area 630 stores contents to be provided to the wireless terminal.

The control unit 640 controls an overall operation of the home contents storage device 400. According to an embodiment of the present invention, the control unit 640 includes a filtering parameter extractor 650, a contents list generator 660, and a UPnP Browse action changer 670.

The filtering parameter extractor 650 checks a device address of the wireless terminal 100 when a contents list of the wireless terminal is requested, and extracts a filtering parameter corresponding to the wireless terminal from the filtering parameter storing area 620.

The contents list generator 660 classifies contents having a bandwidth equivalent to or less than a preset bandwidth from the contents storing area 630 to generate a contents list by using the extracted filtering parameter. When receiving a contents list parameter from the wireless terminal, in a case where the contents list parameter is set so as to perform the filtering, the contents list generator 660 generates a contents list for contents that can be used by the wireless terminal, while generating a contents list for all contents stored in the contents storage device, which is used when the contents list parameter is set so as to not perform the filtering.

According to the second embodiment of the present invention, the contents list generator 660 may sort and generate a contents list with respect to contents corresponding to a bandwidth less than or equal to a preset bandwidth for the wireless terminal and a contents list with respect to contents with a bandwidth greater than the preset bandwidth.

The UPnP Browse action changer 670 changes an UPnP browse action.

Although not illustrated, a home contents storage device according to embodiments of the present invention may include a communication unit that receives a contents list request from the wireless terminal, and sends a generated contents list to the wireless terminal.

Figure 7:
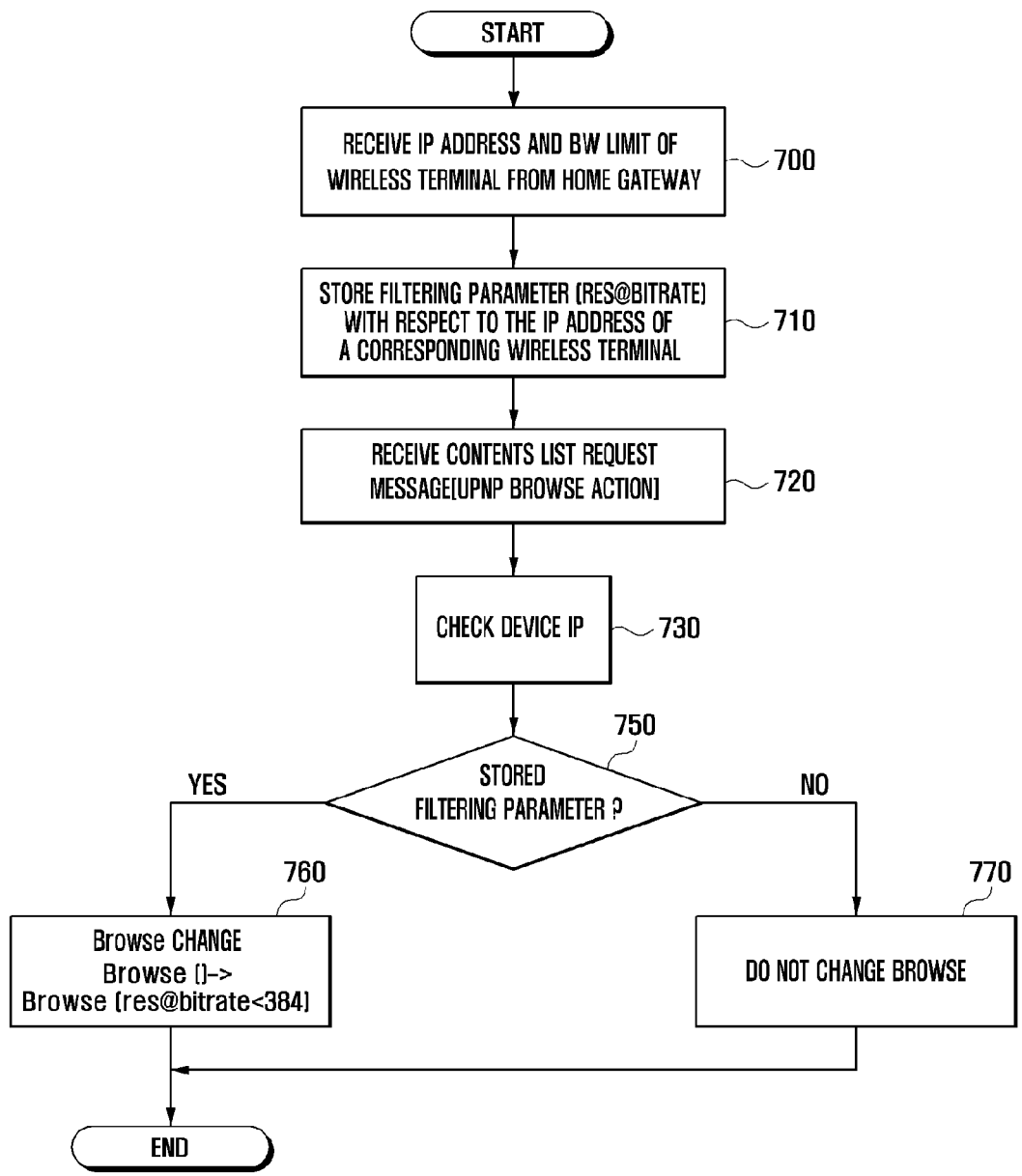
FIG. 7 is a flow chart illustrating an operation sequence of a home contents storage device providing contents to a wireless terminal to according to an embodiment of the present invention.

FIG. 7 is a flow chart illustrating an operation sequence of a home contents storage device providing contents to a wireless terminal according to an embodiment of the present invention.

The home contents storage device 400 receives an IP address and a bandwidth of the wireless terminal 100 from the home gateway 300 in step 700. The home contents storage device 400 stores a filtering parameter with respect to the IP address of a corresponding wireless terminal 100, namely, a bit rate value, in step 710.

The home contents storage device 400 receives a contents list request message (UPnP browse action) from the wireless terminal 100, in zo step 720. The home contents storage device 400 checks an IP address of the wireless terminal 100 (e.g., in the form of a UPnP "Browse" action) in step 730, and determines whether a previously stored filtering parameter exists with respect to an IP address of the wireless terminal 100, in step 750. When a previously stored filtering parameter corresponding to an IP address of the wireless terminal 100 exists, the home contents storage device 400 changes a UPnP Browse action to apply a stored filtering parameter, in step 760. More specifically, the home contents storage device 400 extracts contents having a bit rate less than or equal to a set filtering parameter, such as a bit rate set for generating a contents list, and the generated contents list is transmitted to the wireless terminal 100. According to the second embodiment of the present invention, the home contents storage device 400 may separately generate a first contents list for contents with a bit rate less than or equal to the set bit rate, and generate a second contents list for contents with a bit rate greater than the set bit rate.

Conversely, when filtering parameter corresponding to an IP address of the wireless terminal 100 has not been stored previously, the home contents storage device 400 does not change the UPnP browse action, in step 770.

Figure 8:
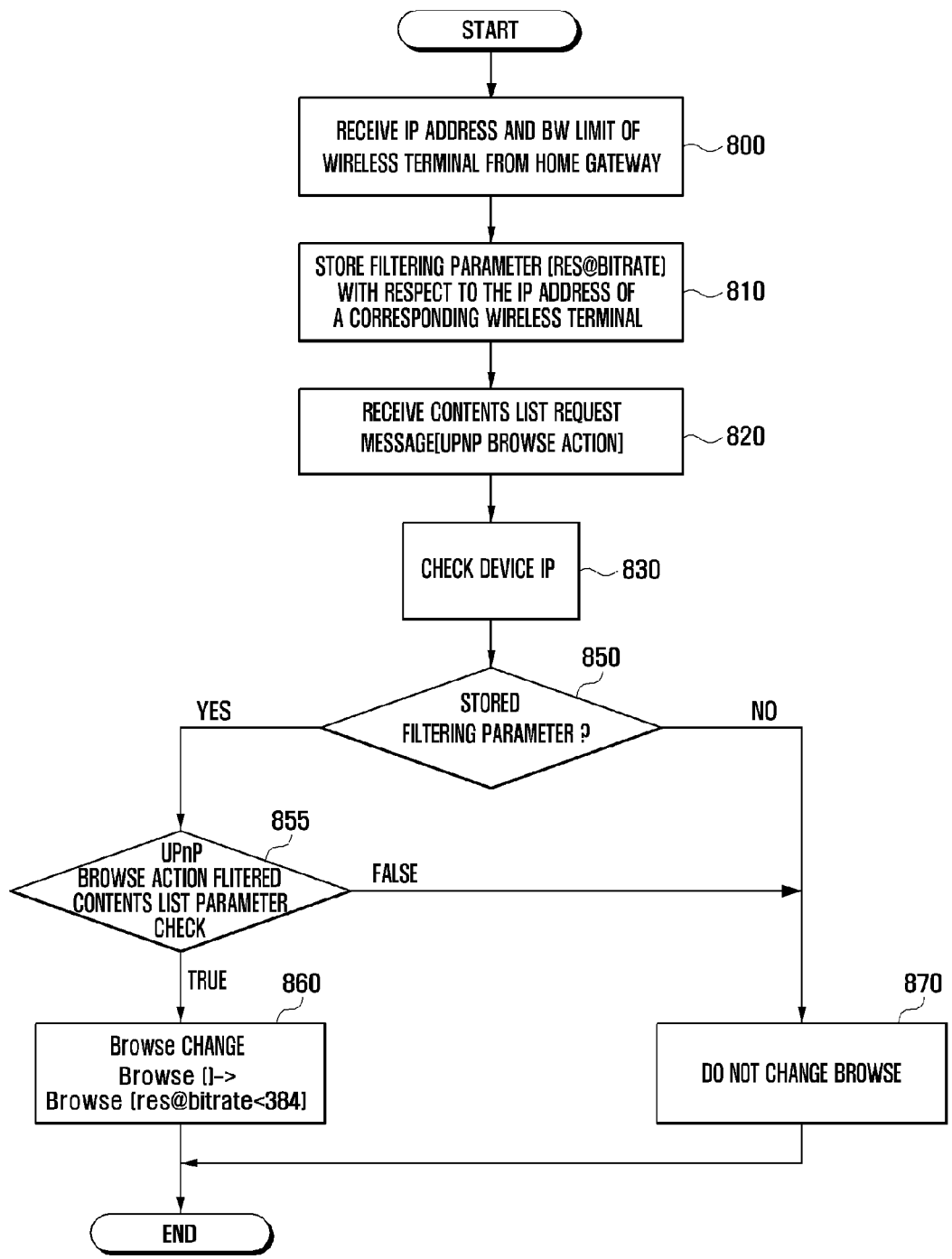
FIG. 8 is a flow chart illustrating an operation sequence of a home contents storage device providing contents to a wireless terminal according to another embodiment of the present invention.

FIG. 8 is a flow chart illustrating an operation sequence of a home contents storage device providing contents to a wireless terminal 100 according to another embodiment of the present invention.

Referring to FIG. 8, the home contents storage device 400 receives an IP address and a bandwidth of the wireless terminal 100 from the home gateway 300 in step 800. Steps 810 to 850 of FIG. 8 are identical with steps 710 to 750 of FIG. 7, and therefore a corresponding description thereof is omitted for conciseness. The home contents storage device 400 checks a filtered contents list parameter value included in an UPnP Browse action sent from a wireless terminal 100, in step 855. When the filtered contents list parameter value is set to "True", the home contents storage device 400 changes the UPnP Browse action to apply a stored filtering parameter, in step 860. When the filtered contents list parameter value is set to "False", the home contents storage device 400 does not change the UPnP Browse action, in step 870.

The remaining step 860 of FIG. 8 is identical with the corresponding step 760 of FIG. 7, and therefore a corresponding description thereof is omitted for conciseness.

According to an embodiment of the present invention, a method fetching a service list of a storage device using a Browse action among UPnP methods has been described as an example. Methods according to various other embodiments of present invention include applying other such services to other actions, including searching.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for using private network contents of a wireless terminal located outside a private network, the method comprising:

transmitting bandwidth information for the wireless terminal and wireless terminal information from a gateway of the private network to a contents storage device of the private network, when the gateway receives a remote access request message including the bandwidth information from the wireless device;

setting, by the contents storage device, a bandwidth as a filtering parameter for the wireless terminal based on the bandwidth information;

receiving, at the contents storage device, a request for a contents list from the wireless terminal;

filtering, by the contents storage device, contents according to whether individual bandwidths of each of the contents are less than or equal to the bandwidth set as the filtering parameter, from among available contents stored in the contents storage device, and generating the contents list according to the filtered contents and the filtering parameter; and transmitting the generated contents list to the wireless terminal.

2. The method of claim 1, wherein the wireless terminal information is an Internet Protocol (IP) address of the wireless terminal.

3. The method of claim 1, wherein requesting the contents list comprises:

transmitting to the contents storage device, by the wireless terminal, a contents list parameter indicating whether filtering will be performed.

4. The method of claim 3, wherein generating a contents list comprises:

generating a contents list for contents available for the wireless terminal when the contents list parameter is set to indicate that filtering will be performed; and generating a contents list for all contents stored in the contents storage device when the contents list parameter is set to indicate that filtering will not be performed.

5. The method of claim 1, wherein generating a contents list comprises:
generating a first sub-contents list for contents classified as having a bandwidth less than or equal to a bandwidth that is set for the wireless terminal; and
generating a second sub-contents list for contents classified as having a bandwidth greater than the set bandwidth.

6. The method of claim 5, wherein transmitting the generated contents list comprises:
transmitting, by the contents storage device, the first sub-contents list and the second sub-contents list to the wireless terminal.

7. The method of claim 6, further comprising:
processing an additional fee, by a service entity, when the wireless terminal selects contents included in the second sub-contents list; and
changing, by the wireless terminal, after processing the additional fee, a bandwidth for receiving the contents by requesting a change of a bandwidth from the gateway.

8. An apparatus for providing contents from a private network to a wireless terminal located outside the private network, the apparatus comprising:
a contents storing area for storing the contents;
a filtering parameter storing area for setting and storing a bandwidth as a filtering parameter based on bandwidth information of the wireless terminal;
a filtering parameter extractor for checking wireless terminal information, and extracting the filtering parameter from the filtering parameter storing area, upon receiving a request for a contents list corresponding to the wireless terminal;
a contents list generator for filtering contents according to whether individual bandwidths of each of the contents are less than or equal to the bandwidth set as the filtering parameter, from among available contents stored in the contents storage device, in order to generate the contents list according to the filtered contents and the filtering parameter; and
a communication unit for transmitting the generated contents list to the wireless terminal.

9. The apparatus of claim 8, wherein the wireless terminal information is an Internet Protocol (IP) address of the wireless terminal.

10. The apparatus of claim 8, wherein the filtering parameter storing area receives, from the wireless terminal, a contents list parameter indicating whether the filtering will be performed.

11. The apparatus of claim 10, wherein the contents list generator generates a filtered contents list for contents available for the wireless terminal when the contents list parameter is set to indicate that filtering will be performed, and generates an unfiltered contents list of all contents stored in the contents storage device when the contents list parameter is set to indicate that filtering will not be performed.

12. The apparatus of claim 8, wherein the contents list generator generates a first sub-contents list for contents classified as having a bandwidth less than or equal to a bandwidth that is set for the wireless terminal and a second sub-contents list for contents classified as having a bandwidth greater than the set bandwidth.

13. The apparatus of claim 12, wherein the communication unit transmits the first sub-contents list and the second sub-contents list to the wireless terminal.

14. The apparatus of claim 13, wherein the contents included in the second sub-contents list can be used in the wireless terminal, after the wireless terminal processes an additional fee to a service entity and a bandwidth for receiving the contents included in the second sub-contents list is changed.

* * * * *